Figure 1:
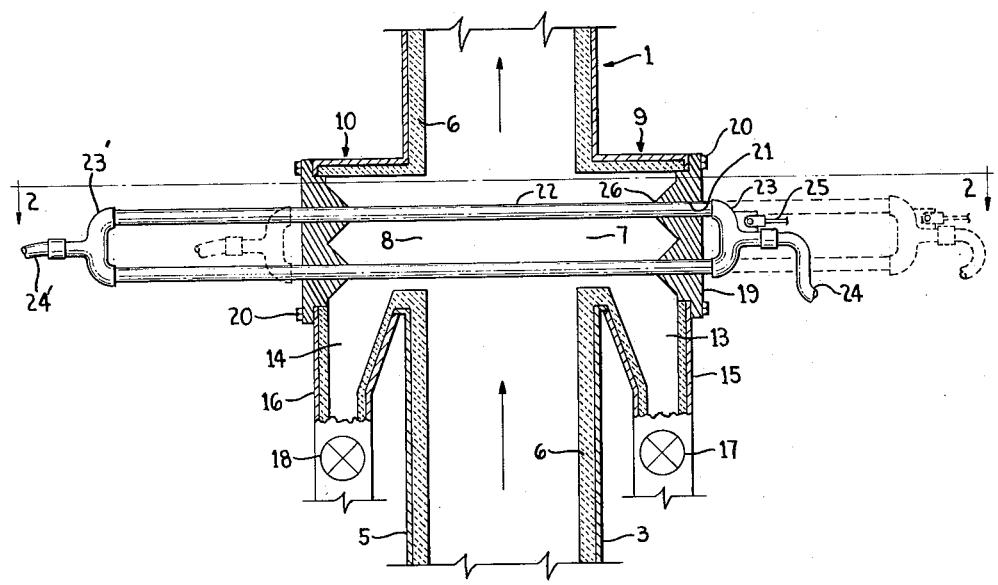

July 10, 1962  R. G. SCHLAUCH  3,043,703

METHOD FOR THE PRODUCTION OF HYDRAULIC CEMENT

Filed Aug. 5, 1958

INVENTOR.
RICHARD G. SCHLAUCH

3,043,703
METHOD FOR THE PRODUCTION OF
HYDRAULIC CEMENT
Richard G. Schlauch, Allentown, Pa., assignor to Fuller Company, Catasauqua, Pa., a corporation of Delaware
Filed Aug. 5, 1958, Ser. No. 753,227
12 Claims. (Cl. 106—100)

The present invention relates to a method for the extraction of volatilized matter from gas streams and is more particularly concerned with the selective extraction of compounds of the alkali metals and other volatilized matter in the form of vapors, fumes or other dispersions of solid or liquid matter from the gases issuing from cement production zones in general, and especially from reaction zones producing hydraulic cements typified by Portland cement.

While the invention is discussed herein with particular reference to volatilized alkalies, it is to be understood that similar selective extraction of excesses of other volatilized matter, such as sulphate compounds, is contemplated.

In many hydraulic cements, compounds of the alkali metals, hereinafter referred to as alkalies, are found which are derived from similar or other alkali compounds originally present in the raw materials. When these alkalies are present in hydraulic cement clinkers of the Portland cement type, in excess of about 0.6%, expressed as their molecular equivalent of sodium oxide, the excess is detrimental to the ultimate utility of concrete produced from such cement. In some cases, as in mass concrete structures and in highway construction, especially when siliceous aggregates are to be used, the presence of such quantities of alkali make the cement unacceptable to the authorities responsible for the construction.

Substantial percentages of the amount of alkali present in the cement raw materials are generally driven off the raw materials during its exposure to the cement-forming reaction temperatures in excess of 2000° F. The alkalies thus driven off are then carried in the gases discharged from the cement-forming reaction zone. It is believed that the alkalies thus driven off occur in several compound forms. When cooled, these alkali compounds tend to sublime or to condense to an ultimate solid phase at and below their condensation points.

Since the gases discharged from such reaction zones generally also carry a substantial portion of material particles, at least a portion of such particles preferably are removed from the gases and returned to the reaction zone to avoid waste of material, as well as avoiding dust nuisances. However, the gas temperatures encountered are normally considerably above the maximum temperature limitations of contemporary dust collecting equipment.

In order to reduce the gas temperatures to the required value, usually below 600° F., previous expedients have employed the tempering of the gas by introduction of atmospheric air, or the cooling thereof by liquid or water sprays and dispersions. However, this temperature reduction induces deposition of the alkalies on the surfaces of the material particles, and the return thereof to the reaction zone with the particles, thereby increasing the percentage of alkali in the material delivered to the reaction zone.

Furthermore, there is an increasing trend to utilize the heat content of gases discharged from such reaction zones for preheating raw materials prior to their introduction to the reaction zone. When the preheating is effected by direct contact of the gases with the raw material, the alkalies present in the gases are prone to condense and adhere to the raw material particles and to return therewith to the cement-forming reaction zone. Therefore, an artificially high alkali content is established in the incoming raw material and since only a portion or a percentage of alkalies introduced with the raw material is driven therefrom in the reaction zone, an undesirable percentage is often passed through the reaction zone and is present in the final cement product. No entirely satisfactory solution to this problem has been known.

In accordance with the present method, the hot gases passing from the reaction zone where cement is being produced and which contain volatile constituents driven off the cement-forming material during the cement-forming reaction are caused to impinge upon a condensing surface to bring about condensation of the entrained volatile components upon said surface, from which they periodically may be removed. In one embodiment of the invention, the exposed surface of the condensed component is maintained at a temperature at which it is in a tacky phase to facilitate adherence thereto of solid matter entrained in the gases.

In general, a preferred form of apparatus for carrying out the method of the present invention, as employed in conjunction with the production of hydraulic cements of the Portland cement type, comprises one or more condensing surfaces or members maintained at a temperature below that of a vapor component of the gases, which may comprise a plurality of tubes cooled by a fluid or liquid such as water, and which are arranged across the interior of a section of conduit adjacent to and leading from a cement-producing reaction zone. The cooled tubes promote condensation of vapors and adherence of liquid and solid particles on their surfaces.

Figure 2:
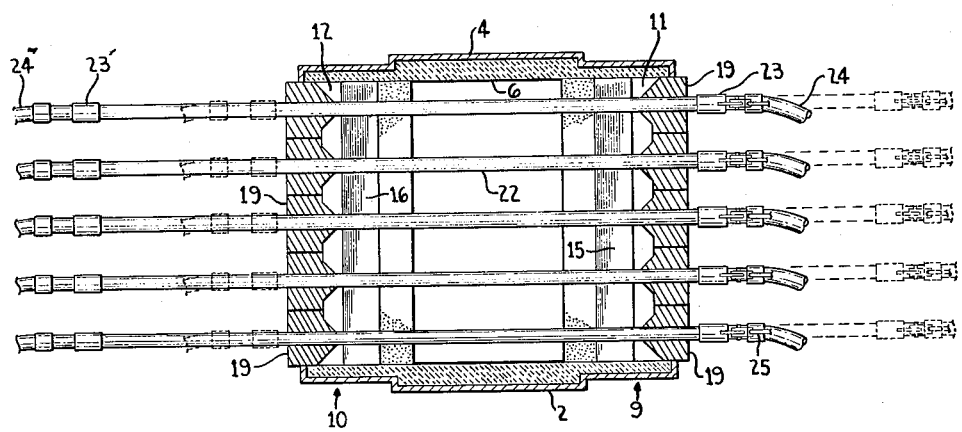

Means are provided for removing, either continuously or at intervals, the material accumulated on the tubes for discharge from the process. This may comprise means for reciprocating the cooled members through cleaners or scrapers positioned adjacent the conduit, and when required, may include a hopper having a valved discharge located beneath the cleaners to collect the removed material for separate discharge. A better understanding of the invention may be derived from the accompanying drawings and description, in which:

FIG. 1 is a vertical sectional view of a form of apparatus for carrying out the method of the invention; and
FIG. 2 is a sectional view taken along the lines 2—2 of FIG. 1.

As shown in FIGS. 1 and 2, one preferred form of apparatus, for use in the production of Portland cement, comprises a casing or conduit 1 leading from a kiln or reaction zone discharging volatilized alkalies and gases. The conduit 1 comprises a plurality of walls 2, 3, 4 and 5, respectively, which are internally lined with a suitable insulation 6.

The walls 3 and 5 are provided with apertures 7 and 8, respectively, which communicate with lateral branches 9 and 10, respectively. The lateral branches 9 and 10 are, in turn, provided with apertures 11 and 12, respectively, which are aligned with apertures 7 and 8 transversely of the conduit 1. The lateral branches 9 and 10 are provided in their lower regions with discharge apertures 13 and 14, respectively, which communicate with discharge hoppers 15 and 16, respectively. The hoppers 15 and 16 are provided with valves 17 and 18, respectively, when air locks are required to prevent substantial leakage into or out of the conduit.

The apertures 11 and 12 are closed by a plurality of scrapers 19, secured therein by bolts 20 engaging the walls of the extensions, preferably with a limited amount of free play in the exact position of the scrapers. Each of the scrapers 19 is provided with a bore 21 extending therethrough in a direction preferably substantially transverse to the axis of the conduit 1. The bores of the respective scrapers of lateral extensions 9 and 10 are aligned in pairs to receive a plurality of tubes 22 therethrough, which extend transversely across the conduit 1 in the path of the gas flow therethrough. The tubes 22 may be formed of stainless steel or any material of construction appropriate to the temperatures to be encountered. As shown, the tubes 22 are arranged in vertical pairs with a plurality of such pairs spaced across the conduit 1. However, it is contemplated that any suitable arrangement of tubes or equivalent solid members, which will result in an intimate contact of the gases with such tubes, may be employed. It is also contemplated that instead of the transverse tubes shown, other solid members which are suitable for introduction to the interior of the conduit 1 may be employed, preferably in a manner assuring the presence of an adequate number of solid members or area of collecting surface in a conduit at any given time.

The ends of each of the vertical pairs of tubes 22 are connected by fittings 23 and 23' to flexible hoses 24 and 24' respectively. A regulated supply of cooling fluid, such as air or water, is delivered from a source (not shown) to one of the hoses 24, 24' of each vertical pair of tubes. It is immaterial to the invention in which direction, with respect to FIGS. 1 and 2, the liquid is passed through the tubes.

Means are provided for reciprocating the tube assemblies in alignment with the bores of the scrapers 19. This may take the form of an hydraulic ram, not shown, having a connecting rod 25 connected to one of the fittings, such as the fitting 23, or any other suitable mechanical means for reciprocation. Alternatively, the tubes or equivalent solid members may be static and the cleaning elements moved in relation thereto, in which case the masses of matter removed from the tubes may be collected in a lower portion of the conduit and subsequently discharged therefrom.

The scrapers 19 are provided with inner scraping edges 26 which engage the external periphery of each of the tubes 22, and are adapted to scrape accumulated material from the surface of the tubes as the tubes are passed therethrough. The limited free play of the scrapers will accommodate slight variations in alignment or uniformity of the tubes. Material thus scraped from the tube surfaces is then free to fall downward into the hoppers 15 and 16, whichever may be the case, and is then discharged therefrom by the valves 17 or 18.

In operation, the gases from the cement-producing reaction zone are passed through the conduit 1. The cooling fluid, either air, or preferably water, is then passed through the appropriate hose 24, 24' fitting 23 and associated tubes 22 to cool the tubes and is thereafter discharged through the opposite hose 24, 24'. The maintenance of the tubes 22 at a temperature below that of the gases and particularly below the condensation point of a substantial component of the volatilized alkalies present in the gas causes a condensation and adherence thereof on the tube surfaces. The condensate preferably is sublimated and deposits on the tube surfaces in a substantially solid ultimate form. However, the presence of the condensing matter on the tube surfaces will promote the adherence of further dispersions of solid or liquid particles, when a partially or generally tacky surface of the condensate occurs either momentarily, as a transition state of the condensate, or permanently as the ultimate form of the condensate at that temperature. The greater portion of the deposited matter is accumulated on the upstream surface of the tubes. The term sublimation is used herein as defining a condensation of volatilized matter to a solid phase without substantial or apparent transition through a flowing liquid phase.

Either continuously, or at intervals which are best determined experimentally as discussed more fully hereinafter, the tubes are reciprocated from one extreme lateral position to the opposite extreme. As shown in FIG. 1, the tubes are in the extreme left hand position. Upon motion of the tubes towards the right, as viewed in FIG. 1, the cutting edges 26 of the scrapers 19 of lateral extension 9 scrape the accumulated matter from the surface of the tubes, whereupon it falls into the hopper 15 for discharge to the valve 17. Subsequently, the tubes are moved to the left, as viewed in FIG. 1, and the scrapers 19 of lateral extension 10 clean the newly accumulated matter from the tubes for discharge by the hopper 16 and valve 18.

The removal of the accumulated matter from the condensing surface will generally be facilitated by shrinkage or contraction of the tubes and the accumulated mass, at dissimilar rates, under the influence of the cooling medium and upon removal from intimate contact with the extreme temperatures of the flowing gases. In some instances, the deposit of material generally will tend to crack and separate from the condensing surfaces as soon as they are both removed from the main flow of the gases, thereby minimizing the cleaning or scraping force required.

Variables such as the velocity and temperature of the gas, the amount of vapors or material to be extracted from the gas, and the number of solid members or the total effective condensing surface area of the solid members, all generally affect the rate of deposition of condensate and adhering material. Therefore, the duration of retention of a given area of the condensing surfaces in the gas stream, which is a function of either the interval between shifts of the apparatus of FIG. 1 or the rate of linear motion of the tubes when in continuous reciprocation, is best determined experimentally. Furthermore, it is preferable to provide means for regulating the duration of retention of the condensing surfaces in the gases to accommodate changes in one of these variables, as is likely to occur within limits, in cement-producing reaction zones.

A further factor which may affect the determination of the preferred duration of the condensing surface within the gas stream, as in the example cited hereinafter, is that of a variation in composition of the accumulated matter upon continued deposition. A heavy accumulation of matter on the condensing surfaces not only may impair the efficiency of the unit but, in some cases, also causes a change in the fraction of the gas-stream content which is extracted. It is believed that this is the result of a rising condensing-surface temperature caused by the insulating effect of the accumulated matter, and a consequent reduction in either the amount of volatilized matter condensed thereby, or the rate of completion of the condensation process, or both.

For the selective extraction of alkalies in the production of Portland cement in conjunction with a direct gas-contact raw material preheater, it has been found generally preferable to limit the accumulation of material on any condensing surface to a maximum depth or thickness of about one-sixteenth of an inch. For example, in an installation producing Portland cement and including a rotary cement kiln associated with a preheater of the type shown in the patent to Müller et al., U.S. 2,663,560, issued December 22, 1953, two inch black steel pipe was inserted transversely into the gas stream passing from the kiln to the preheater, and the water supply therethrough was regulated to produce a 90° to 100° F. temperature in the water after passage through the gas-contact portion of the pipe. The gases leaving the kiln were in the order of 1900°–2000° F. The gases were then passed in direct heat exchange relation with the feed for the kiln to preheat the feed material, and then through dust separators. The separated dust was returned to the reaction zone, all in the manner disclosed in the aforesaid patent.

After approximately one minute of exposure to the gases, a coating of white solids was accumulated to a depth of about 3/64". Analysis of this deposit disclosed the presence of 29.65% potassium oxide and 1.17% sodium oxide, by weight.

Continued deposition beyond the first minute, up to and including a ten minute overall exposure time, yielded a yellowish brown material deposit over the whitish deposit, which, upon analysis, was found to contain only 16.56% potassium oxide and 0.81% sodium oxide, by weight, and contained substantially greater amounts of dust of cement-forming compounds. The higher percentage of alkali in the layer of material next to the tubes is due to the fact that the tubes were sufficiently cold that the volatilized alkali in the gases condensed thereon in a solid state which impeded the adhesion thereto of dust particles in the gases. As the deposition of material on the tubes increased, it had an insulating effect with the result that the exposed surface of the deposited material was at a lower temperature and in a tacky phase. When the exposed surface reached that stage, dust particles adhered thereto to a greater extent, with resultant increase in the percentage of dust in the deposited material and a corresponding decrease in the percentage of the alkali therein.

While this change in the percentage composition of matter accumulated under prolonged exposure may not occur in all processes to which the present invention may be applied, it is likely to be encountered and to be of particular interest when the invention is used for the selective extraction of volatilized matter in the production of hydraulic cement in conjunction with a direct-contact, raw material preheater. In these cases, it is generally desirable to retain the cement product or raw material dusts in the system for return to the reaction zone with the incoming preheated raw material. Therefore, it is advantageous to have such dust continue in the gases to the preheating stage where it is brought into contact with and joints the raw material, rather than being extracted in large precentages with the condensed alkalies.

In some cases, the rise in temperature of the condensing surface, which surface becomes that of the accumulated matter after continued deposition, may take that surface above the condensation point of a volatilized component of the gases, thereby substantially precluding further extraction of that component. Also, the reduced heat transfer rate from a newly-deposited condensing particle through the accumulated solid matter to the cooled surface of the tube or solid member may establish or prolong an intermediate, liquid or tacky phase of the condensing particle. The prolonged liquid or tacky phase is then prone to cause the adherence of increased or excessive amounts of miscellaneous particles encountering the condensing surface.

Where the total collection of matter is of prime importance, rather than a critical control over the generally selective extraction of one component in preference to another, a prolonged liquid or tacky phase may be established by permitting a substantial build-up of matter on the condensing surface. Alternatively, regulation of the temperature of the condensing surface of the solid member itself may be employed to reduce the velocity of the completion of condensation and sublimation, thereby permitting lesser intervals between cleaning of the condensing surface or a higher rate of cleaning thereof when prolonged exposure makes removal of the deposit more difficult.

Various changes may be made in the details of the invention as disclosed without sacrificing the advantages thereof or departing from the scope of the appended claims.

I claim:

1. A method for the production of hydraulic cement comprising establishing cement-forming reaction conditions in a reaction zone, introducing cement-forming materials into the reaction zone, passing gases containing volatilized matter driven off the cement-forming material in the reaction zone while at a temperature above the condensation point of said volatilized matter through a discharge zone, causing the gases passing through said discharge zone to impinge upon a condensing surface, maintaining a cooling medium in contact with said condensing surface, controlling the transfer of heat between said cooling medium and said condensed component to maintain said condensing surface at a temperature below the condensation point of a volatilized component of said gases, whereby said volatilized component will condense on said condensing surface, and to maintain the exposed surface of said condensed component at a temperature at which it is in a tacky phase to facilitate adherence thereto of solid matter entrained in said gases, removing the condensed component from said condensing surface in said discharge zone, and separately discharging from said discharge zone the removed condensed component and adhered solid matter, and the gases from which said component was separated.

2. A method for the production of hydraulic cement according to claim 1 in which the temperature of said condensing surface is reduced in conjunction with the removal of extracted matter therefrom relative to the condensed component to cause a contraction of said condensing surface away from the condensed matter to facilitate the removal of said condensed matter.

3. A method for the production of hydraulic cement according to claim 2 in which the temperature of the condensing surface is maintained by a cooling process, the condensing surface is removed from the main flow of the gas stream during the removal of the condensed matter therefrom, and the cooling process is continued during the absence of the condensing surface from the main flow of the gas stream.

4. A method for the production of hydraulic cement comprising establishing a cement-forming reaction zone, introducing cement-forming materials into the reaction zone, passing gases containing volatilized alkalies driven off the cement-forming materials in the reaction zone while at a temperature above the condensation point of said volatilized alkalies, through a discharge zone, causing the gases passing through said discharge zone to impinge upon a condensing surface, maintaining a cooling medium in contact with said condensing surface, controlling the transfer of heat between said cooling medium and said condensed alkalies to maintain said condensing surface at a temperature below the condensation point of said volatilized alkalies, whereby said volatilized alkalies will condense on said condensing surface, and to maintain the exposed surface of said condensed alkalies at a temperature at which they are in a tacky phase to facilitate adherence thereto of solid matter entrained in said gases, removing the condensed alkalies from said condensing surface in said discharge zone, and separately discharging from said discharge zone the removed condensed alkalies and adhered solid matter, and the gases from which said component was separated, pre-heating further cement-forming material by direct contact with said separately discharged gases, introducing said pre-heated cement-forming material to said reaction zone, and withdrawing cement from said reaction zone.

5. A method for the production of hydraulic cement according to claim 4 including accumulating a substantial deposit of condensate on the solid member to cause a reduction in the rate of heat transfer from the surface of the condensate in contact with the gases to the solid member.

6. The method of claim 4 in which the temperature of the solid member is reduced in conjunction with the removal of the condensed component therefrom relative to the condensed component to cause a contraction thereof to facilitate removal of the condensed component.

7. The method of claim 6 in which the temperature of the condensing surface is maintained by a cooling process, the condensing surface is removed from the main flow of the gas stream during the removal of the collected condensate therefrom and the cooling process is continued during the absence of the condensing surface from the main flow of the gas stream.

8. The method of claim 4 in which the temperature of the condensing surface is maintained by a cooling process causing a substantially solid phase condensate, and the rate of completion of condensation of the volatilized component to a solid phase on the condensing surface is regulated by the cooling system.

9. A method for the production of hydraulic cement comprising establishing cement-forming reaction conditions in a reaction zone, introducing cement-forming materials into the reaction zone, passing gases containing volatilized matter drive off the cement-forming material in the reaction zone through a discharge zone, causing the gases passing through said discharge zone to impinge upon a hollow member having an exterior condensing surface, flowing a cooling medium through said hollow member in heat exchange relation with said condensing surface, controlling the transfer of heat between said cooling medium and condensed component on said condensing surface to maintain said condensing surface at a temperature below the condensation point of a volatile component of said gases, whereby said volatile component will condense on said condensing surface, and to maintain the exposed surface of said condensed component at a temperature at which it is in a desired phase to cause a selective separation of components from said gases, removing the condensed component from said condensing surface in said discharge zone, and separately discharging from said discharge zone the removed condensed component and the gases from which said component was separated.

10. The method for the production of hydraulic cement according to claim 9 in which the exposed surface of the condensed component is maintained at a phase impeding deposition of certain matter from said gases.

11. A method for the production of hydraulic cement comprising establishing a cement-forming reaction zone, introducing cement-forming materials into the reaction zone, passing gases containing volatilized alkalies driven off the cement-forming materials in the reaction zone through a discharge zone, causing the gases passing through said discharge zone to impinge upon a hollow member having an exterior condensing surface, flowing a cooling medium through said hollow member in heat exchange relation with said condensing surface, controlling the transfer of heat between said cooling medium and alkali condensed on said condensing surface to maintain said condensing surface at a temperature below the condensation point of said volatilized alkalis, whereby said volatilized alkalis will condense upon said condensing surface and to maintain the exposed surface of said condensed alkali at a temperature at which it is in a desired phase to cause selective separation of components from said gases, removing the matter deposited on said condensing surface in said discharge zone, separately discharging from said discharge zone the removed matter deposited on said condensing surface and the gases from which said matter was separated, preheating further cement-forming material by direct contact with said separately discharged gases, introducing said preheated cement-forming material to said reaction zone, and withdrawing cement product from said reaction zone.

12. The method for the production of hydraulic cement according to claim 11 in which the exposed surface of the condensed component is maintained at a phase impeding deposition of certain matter from said gases.

References Cited in the file of this patent

UNITED STATES PATENTS

| | | |
|---|---|---|
| 1,037,672 | Selick | Sept. 3, 1912 |
| 1,891,820 | Johnston | Dec. 20, 1932 |
| 1,985,156 | Fieldhouse | Dec. 18, 1934 |
| 2,233,066 | Watson | Feb. 25, 1941 |
| 2,329,940 | Ponzer | Sept. 21, 1943 |
| 2,592,468 | Rex | Apr. 8, 1952 |
| 2,757,079 | Magee | July 31, 1956 |
| 2,871,133 | Palonene et al. | Jan. 27, 1959 |
| 2,893,850 | Von Bichowsky | July 7, 1959 |

FOREIGN PATENTS

| | | |
|---|---|---|
| 28,970 of 1912 | Great Britain | Mar. 27, 1913 |